United States Patent [19]

Yatsuka et al.

[11] Patent Number: 5,009,960
[45] Date of Patent: Apr. 23, 1991

[54] MAGNETIC RECORDING MEDIUM PREPARED WITH POLYURETHANE RESIN MODIFIED BY A BICYCLIC AMIDE ACETAL

[75] Inventors: Takeshi Yatsuka; Hiroshi Murata; Yutaka Mizumura; Nobukazu Kotera, all of Ohtsu, Japan

[73] Assignee: Ashland Oil, Inc., Russell, Ky.

[21] Appl. No.: 432,555

[22] Filed: Nov. 6, 1989

[30] Foreign Application Priority Data

Nov. 8, 1988 [JP] Japan ................................ 63-282269

[51] Int. Cl.$^5$ ............................................. G11B 23/90
[52] U.S. Cl. .................................. 428/423.1; 428/694; 428/900; 428/425.9
[58] Field of Search ...................... 428/900, 694, 425.9, 428/423.1

[56] References Cited

U.S. PATENT DOCUMENTS

| 4,152,485 | 5/1979 | Mizumura et al. | 428/425 |
| 4,584,363 | 4/1986 | Goel et al. | 528/73 |
| 4,842,942 | 6/1989 | Yatsuka et al. | 428/425.9 |

*Primary Examiner*—Paul J. Thibodeau
*Assistant Examiner*—Stevan A. Resan
*Attorney, Agent, or Firm*—Leydig, Voit & Mayer

[57] ABSTRACT

A magnetic recording medium is disclosed which comprises a non-magnetic support and a magnetic coating layer formed thereon, the magnetic coating layer being formed by applying a magnetic coating composition comprising a resinous binder and magnetic particles dispersed therein, wherein the coating composition contains, as a resinous binder, a modified polyurethane resin obtained by reacting a polyurethane resin (A) with a bicyclic amide acetal (B), the polyurethane resin (A) having carboxyl groups in an amount of 50 to 2,000 equivalents/$10^6$ g and the equivalent ratio of the bicyclic amide acetal (B) to the carboxyl groups of the polyurethane resin (A) being within the range of 0.5 to 2.0.

4 Claims, No Drawings

MAGNETIC RECORDING MEDIUM PREPARED WITH POLYURETHANE RESIN MODIFIED BY A BICYCLIC AMIDE ACETAL

BACKGROUND OF THE INVENTION

1. Field of the invention

The present invention relates to magnetic recording media such as magnetic tapes, magnetic discs, and the like, which are obtained by applying a magnetic coating composition to a non-magnetic support.

2. Description of the prior art

In general, magnetic recording media for general purpose such as magnetic tapes and magnetic discs are produced by applying a magnetic coating composition to a polyethylene terephthalate film used as a non-magnetic support. The magnetic coating composition is usually prepared by dispersing needle-like magnetic particles having a long axis with a length of 1 μm or less in a solution of resinous binder together with appropriate additives such as dispersing agents, lubricating agents, and antistatic agents.

The resinous binders used in the magnetic recording media are required, not only to yield excellent dispersibility, filling efficiency, and orientation of magnetic particles, but also to provide the magnetic coating layer with excellent durability, abrasion resistance, heat resistance, smoothness, and adhesion to the non-magnetic support. Thus, the resinous binders play a very important role. Examples of conventional resinous binders which have been hitherto used include vinyl chloride/vinyl acetate copolymers, vinylchloride/vinyl acetate/vinyl alcohol copolymers, vinyl chloride/vinylidene chloride copolymers, polyurethane resins, polyester resins, acrylonitrile/butadiene copolymers, nitrocellulose, cellulose acetate butyrate, epoxy resins, and acrylic resins.

Of these resins, polyurethane resins are excellent only in properties such as toughness and abrasion resistance due to intermolecular hydrogen bonds through a urethane linkage, compared to other resins. However, conventional polyurethane resins of adipate or caprolactone type alone are inferior in properties such as blocking resistance, heat resistance, and running stability. For these reasons, a mixed system of polyurethane resins with nitrocellulose or vinyl chloride/vinyl acetate copolymers is particularly used. Furthermore, in order to improve durability, heat resistance, adhesive properties, and the like, a curing agent is used in combination therewith. In general, polyisocyanate compounds are used as a curing agent. For the purpose of accelerating a reaction with a curing agent, aging is performed at a temperature of 40° C. or higher over a long period of time, after the application and drying of a magnetic coating composition.

Conventional resinous binders are still insufficient for properties such as durability and abrasion resistance, particularly in the practical use such as video tapes, magnetic tapes for electronic computers, and floppy discs, all of which are required to have high performance and high reliability.

In addition, demand for high density and high quality magnetic recording media is increasing. Therefore, the smoothening of the magnetic coating layer is desired. In actuality, the surface smoothness of a magnetic coating layer for high density tapes and high quality tapes is being remarkably improved. As the required smoothness increases, the running durability of magnetic tapes prepared with conventional resinous binders has become insufficient, and therefore, it is desired that resinous binders with a higher durability will be developed.

In response to this requirement, an increased reactivity with a polyisocyanate compound used as a curing agent is required for resinous binders. For polyurethane resins, it has been proposed to introduce tri- or multifunctional components, such as trimethylolpropane, glycerine, diethanolamine, and pentaerythritol, into the resin. This method involves a serious drawback in that the dispersibility of magnetic particles decreases as the durability is improved; alternatively, in cases where the satisfactory durability is maintained, there is a danger that polyurethane resins might be gelled during the preparation thereof.

In recent years, fine magnetic particles made of materials such as metals and barium ferrite have been employed because of their high recording density and the high quality required for magnetic recording media. However, the performance that satisfies both durability and dispersibility is still required for resinous binders.

A method for improving the dispersibility of magnetic particles is to incorporate metal sulfonate groups or metal salt groups of an acidic phosphorus compound as disclosed in Japanese Patent Publication Nos. 57-3134 and 58-41564 and Japanese Laid-Open Patent Publication No. 61-48122. However, the introduction of tri- or multi-functional components into the resin containing metal sulfonate groups or metal salt groups of an acidic phosphorus compound for the purpose of improving the durability results in a lowering dispersibility.

SUMMARY OF THE INVENTION

The magnetic recording medium of this invention, which overcomes the above-discussed and numerous other disadvantages and deficiencies of the prior art, comprises a non-magnetic support and a magnetic coating layer formed thereon, the magnetic coating layer being formed by applying a magnetic coating composition comprising a resinous binder and magnetic particles dispersed therein, wherein the coating composition contains, as a resinous binder, a modified polyurethane resin obtained by reacting a polyurethane resin (A) with a bicyclic amide acetal (B), the polyurethane resin (A) having carboxyl groups in an amount of 50 to 2,000 equivalents/$10^6$ g and the equivalent ratio of the bicyclic amide acetal (B) to the carboxyl groups of the polyurethane resin (A) being within the range of 0.5 to 2.0.

In a preferred embodiment, the polyurethane resin (A) contains, as a functional group, at least one selected from the class consisting of metal sulfonate groups and metal salt groups of an acidic phosphorus compound in an amount of 4 to 400 equivalents per grams of the resin.

In a preferred embodiment, the polyurethane resin (A) is a polyurethane resin obtained by reacting therewith a phosphorus compound of the formula:

-continued

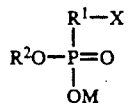
(III)

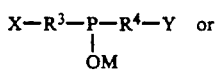
(IV)

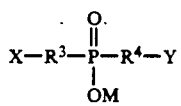
(V)

wherein each of X and Y, independently is an ester-forming functional group; $R^1$ is a hydrocarbon group of 3 to 10 carbon atoms; $R^2$ is an alkyl group of 1 to 12 carbon atoms, a cycloalkyl group of 6 to 12 carbon atoms, or an aryl group of 6 to 12 carbon atoms, wherein the aryl group may contain a halogen atom, a hydroxyl group, an OM' group (wherein M' is an alkali metal atom), or an amino group; each of $R^3$ and $R^4$, independently is an alkylene group of 2 to 4 carbon atoms; and M is an alkali metal atom.

In a preferred embodiment, the bicyclic amide acetal (B) is of the formula:

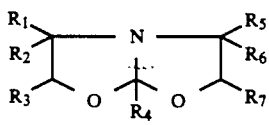
(VI)

wherein each of $R_1$, $R_2$, $R_5$, $R_6$, and $R_7$, independently is hydrogen or an alkyl group of 1 to 20 carbon atoms; $R_3$ is hydrogen, an alkyl group of 1 to 20 carbon atoms, an aryl group of 6 to 12 carbon atoms, or an ether group of 1 to 20 carbon atoms; and $R_4$ is an alkyl group of 1 to 20 carbon atoms or an alkaryl group of 7 to 22 carbon atoms.

Thus, the invention described herein makes possible the objectives of (1) providing a magnetic recording medium with excellent solvent resistance and excellent running durability, wherein a modified polyurethane resin used as a resinous binder is excellent in reactivity with a polyisocyanate compound used as a curing agent, so that the density of crosslinking is increased, resulting in a significant improvement of solvent resistance and running durability; (2) providing magnetic recording medium with more excellent running durability, wherein a modified polyurethane resin used as a resinous binder has metal sulfonate groups and/or metal salt groups of an acidic phosphorous compound, so that the dispersibility of magnetic particles is increased, resulting in a significant improvement of running durability.

DESCRIPTION OF THE PREFERRED EMBODIMENTS

The magnetic recording medium of the present invention comprises a non-magnetic support and a magnetic coating layer formed thereon. The magnetic coating layer is formed by applying a magnetic coating composition to the non-magnetic support. The magnetic coating composition contains a resinous binder and magnetic particles dispersed therein.

The resinous binder which is used in this invention is a reaction product of a polyurethane resin (A) with a bicyclic amide acetal (B). The equivalent ratio of the bicyclic amide acetal (B) to the carboxyl groups of the polyurethane resin (A) is within the range of 0.5 to 2.0. The polyurethane resin (A) has carboxyl groups in an amount of 50 to 2,000 equivalents/$10^6$ g. Preferably, the polyurethane resin(A) has a molecular weight of 8,000 or more. The bicyclic amide acetal (B) easily reacts with a carboxyl group to form a segment having a hydroxy group at the terminal thereof.

The polyurethane resin (A) can be obtained from a long-chain polyol having a molecular weight of 500 to 5,000 and a diisocyanate compound and, if necessary, a low molecular weight compound having a molecular weight of less than 500 which is bifunctional to an isocyanate group. Examples of suitable long-chain polyols include polyester polyols and polycarbonate polyols. Preferred are polyester polyols because of the excellent resin properties.

Examples of carboxylic acid components of the polyester polyol include aromatic dicarboxylic acids such as terephthalic acid, isophthalic acid, orthophthalic acid, and 2,6-naphthalic acid; aromatic oxycarboxylic acids such as p-oxybenzoic acid and p-(hydroxyethoxy)benzoic acid; aliphatic dicarboxylic acids such as succinic acid, adipic acid, azelaic acid, sebacic acid, and dodecanedicarboxylic acid; alicyclic dicarboxylic acids such as cyclohexanedicarboxylic acid and hydrogenated 2,6-naphthalenedicarboxylic acid.

Examples of glycol components of the polyester diol include ethylene glycol, propylene glycol, 1,3-propanediol, 1,4-butanediol, 3-methyl-1,5-pentanediol, 1,6-hexanediol, neopentyl glycol, diethylene glycol, dipropylene glycol, cyclohexanedimethanol, ethylene oxide adducts of bisphenol A, polyethylene glycol, polypropylene glycol, and polytetramethylene glycol.

Besides the above-described components, the polyester polyols may contain other components such as dicarboxylic acids or glycols containing metal sulfonate groups and dicarboxylic acids or glycols containing metal salt groups of an acidic phosphorus compound of Formula (I) to (V) below. The metal sulfonate groups or the metal salt groups of an acidic phosphorus compound are effective for significantly improving the dispersibility of magnetic particles.

Examples of components containing metal sulfonate group include sodium 5-sulfoisophthalate, potassium 5-sulfoisophthalate, sodium sulfoterephthalate, sodium 2-sulfo-1,4-butanediol, and sodium 2,5-dimethyl-3-sulfo-2,5-hexanediol. It is preferred that the metal sulfonate groups be present in an amount of 4 to 400, more preferably 10 to 200 equivalents, per $10^6$ grams of the polyurethane resin (A). Amounts less than 4 equivalents are undesirable because the dispersibility of magnetic particles cannot be improved, whereas amounts greater than 400 equivalents are undesirable because the viscosity of solution becomes so high that the handling of the solution becomes difficult, or the resin properties tend to be affected by humidity.

The component containing metal salt groups of an acidic phosphorus compound is of the formula:

(I)

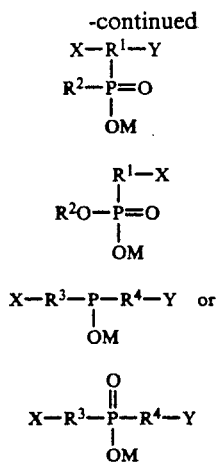

$$X-R^3-P-R^4-Y \quad \text{or} \quad (IV)$$
$$\underset{OM}{|}$$

$$X-R^3-\overset{O}{\underset{|}{\overset{\|}{P}}}-R^4-Y \quad (V)$$
$$\underset{OM}{}$$

wherein each of X and Y, independently is an ester-forming functional group; $R^1$ is a hydrocarbon group of 3 to 10 carbon atoms; $R^2$ is an alkyl group of 1 to 12 carbon atoms, a cycloalkyl group of 6 to 12 carbon atoms, or an aryl group of 6 to 12 carbon atoms, wherein the aryl group may contain a halogen atom, a hydroxyl group, an OM' group (wherein M' is an alkali metal atom), or an amino group; each of and $R^3$ and $R^4$, independently is an alkylene group of 2 to 4 carbon atoms; and M is an alkali metal atom.

It is preferred that the metal salt groups of an acidic phosphorus compound be present in an amount of 4 to 400, more preferably 10 to 200 equivalents, per $10^6$ grams of polyurethane resin (A). Amounts less than 4 equivalents are undesirable because the dispersibility of magnetic particles cannot be improved, whereas amounts greater than 400 equivalents are undesirable because the viscosity of the solution becomes so high that the handling of the solution becomes difficult, or the resin properties tend to be affected by humidity.

Both the metal sulfonate groups and the metal salt groups of an acidic phosphorus compound may be present in the polyurethane resin (A), with the total content thereof being 4 to 400 equivalents per $10^6$ grams of the resin.

As the polyester polyol, lactone type polyester polyols which are obtained by ring opening polymerization of lactones such as ε-caprolactone and δ-valerolactone can also be used.

Examples of diisocyanate compounds which are used for the preparation of the polyurethane resin (A) include aromatic diisocyanates such as tolylene diisocyanate, p-phenylene diisocyanate, m-phenylene diisocyanate, diphenylmethane diisocyanate, and naphthalene diisocyanate; and aliphatic or alicyclic diisocyanates such as hexamethylene diisocyanate, xylylene diisocyanate, 4,4'-diisocyanatocyclohexylmethane, and isophoron diisocyanate.

The low molecular weight compound which is used for the preparation of the polyurethane resin (A) when necessary is bifunctional to an isocyanate group and has the effect of increasing the amount of urethane group or urea group in the polyurethane resin (A) to provide toughness inherent with polyurethane resins. Specific examples of this compound include glycols such as ethylene glycol, propylene glycol, tetramethylene glycol, 1,6-hexanediol, cyclohexanedimethanol, diethylene glycol, neopentyl glycol, and 3-methyl-1,5-pentanediol; aminoalcohols such as monoethanolamine and N-methylethanolamine; diamines such as hexamethylene-diamine, isophoronediamine, diaminodiphenylmethane, and diaminodiphenyl ether; carboxyl group-containing glycols such as dimethylolpropionic acid and tartaric acid.

The polyurethane resin (A) contains carboxyl groups in an amount of 50 to 2,000, preferably 100 to 1,000 equivalents, per $10^6$ grams of the resin. Amounts less than 50 equivalents are undesirable because the effect of modification with the bicyclic amide acetal (B) is not appreciable, whereas amounts greater than 2,000 equivalents are undesirable because a usable period of time after addition of a curing agent becomes shorter and the physical properties of the modified polyurethane resin are greatly affected by humidity.

For introducing carboxyl groups into a polyurethane resin, there is a method using as a starting material, polyester polyols containing carboxyl groups in a portion of the side chains or terminals; or another method using a carboxyl group-containing glycol such as dimethylolpropionic acid and tartaric acid as a chain extending agent or a part thereof; and the like. Preferred is the method using a carboxyl group-containing glycol as a chain extending agent because of the excellent dispersibility of magnetic particles in the polyurethane resin modified with bicyclic amide acetals.

The bicyclic amide acetal (B) is of the formula:

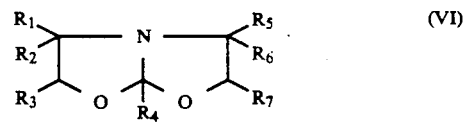

wherein each of $R_1$, $R_2$, $R_5$, $R_6$, and $R_7$, independently is hydrogen or an alkyl group of 1 to 20 carbon atoms; $R_3$ is hydrogen, an alkyl group of 1 to 20 carbon atoms, an aryl group of 6 to 12 carbon atoms, or an ether group of 1 to 20 carbon atoms; and $R_4$ is an alkyl group of 1 to 20 carbon atoms or an alkaryl group of 7 to 22 carbon atoms.

The bicyclic amide acetal (B) is used in an amount of 0.5- to 2-fold, preferably 0.7- to 1.3-fold equivalents, based on the carboxyl group equivalent of the polyurethane resin (A). Amounts less than 0.5-fold equivalents are undesirable because the effect of using the bicyclic amide acetals compound is not appreciable, whereas amounts greater than 2-fold equivalents are undesirable because a significant amount of bicyclic amide acetal remains unreacted, so that the effect of a lubricating agent, such as stearic acid, palmitic acid, or oleic acid, used in the magnetic coating, is reduced.

The bicyclic amide acetal (B) is allowed to react with the polyurethane resin (A) at a temperature of from room temperature to about 120° C. Preferably, the reaction is conducted in a solvent inert to the bicyclic amide acetal, such as toluene, methyl ethyl ketone, and cyclohexanone.

In the present invention, for the purpose of controlling flexibility, improving low temperature flexibility and heat resistance, it is desired either to incorporate other resins into the magnetic coating composition, in addition to the modified polyurethane resin, or to mix, with the magnetic coating composition, compounds capable of reacting with the modified polyurethane resin and/or other resins to cause crosslinking. Examples of these resins include vinyl chloride copolymers, polyester resins, cellulose resins, epoxy resins, phenoxy resins, polyvinyl butyral resins, acrylonitrile-butadiene copolymers, and polyurethane resins.

Examples of compounds capable of reacting with the modified polyurethane resin to cause crosslinking include polyisocyanate compounds, epoxy resins, melamine resins, and urea resins. Among them, particularly desired are polyisocyanate compounds.

Examples of ferromagnetic particles which are used in this invention include $\gamma$-$Fe_2O_3$, mixed crystals of $\gamma$-$Fe_2O_3$ and $Fe_3O_4$, $CrO_2$, $\gamma$-$Fe_2O_3$ or $Fe_3O_4$ coated with cobalt, iron carbide, barium ferrite, and ferromagnetic alloy powders such as Fe-Co and Fe-Co-Ni alloys.

The magnetic coating composition of the present invention may contain, if necessary, a plasticizer such as dibutyl phthalate or triphenyl phosphate; a lubricating agent such as sodium dioctylsulfosuccinate, t-butylphenol polyethylene ether, sodium ethylnaphthalenesulfonate, dilauryl succinate, zinc stearate, soybean oil lecithin, silicone oil, stearic acid, palmitic acid, oleic acid, butyl stearate, butyl palmitate, and butyl oleate; or various antistataic agents.

The functional group obtained by reacting the bicyclic amide acetal (B) with a carboxyl group of the polyurethane resin (A) is excellent in reactivity with a polyisocyanate compound used as a curing agent. One possible reason for this is that the functional group having a hydroxy group at the terminal thereof has a high extent of molecular motion. Because of the high reactivity with a curing agent, the magnetic recording medium of this invention has an improved durability.

Furthermore, the functional group obtained from the bicyclic amide acetal (B) does not have so long a chain that reduces the dispersibility of magnetic particles. For this reason, the durability of the magnetic recording medium can be improved by using a linear polyurethane resin having carboxyl groups on the side chains thereof as the polyurethane resin (A), without causing a reduction in the dispersibility of magnetic particles.

EXAMPLES

The present invention will be further explained by reference to the following examples wherein parts are parts by weight unless otherwise indicated.

The following examples (A to J) show the preparation of modified polyurethane resins in accordance with the present invention, whereas the following comparative examples (A to E) show the preparation of modified polyurethane resins departing from the scope of the present invention.

Examples A to C

First, 100 parts of polyester (I) having a molecular weight of 2,000, which is composed of terephthalic acid/isophthalic acid/sodium 5-sulfoisophthalic acid//ethylene glycol/neopentyl glycol (the molar ratio thereof being 60/38/2//60/40), were dissolved in 150 parts of toluene. The solution was heated to remove 50 g of the toluene from the solution by single distillation, so that the solution was dehydrated. After cooling to 80° C., 100 parts of polybutylene adipate having a molecular weight of 2,000, 14 parts of dimethylolpropionic acid (DMPA), 8 parts of neopentyl glycol (NPG), and 200 parts of methyl ethyl ketone were added to the solution and 70 parts of 4,4'-diphenylmethane diisocyanate (MDI) were then added thereto. After allowing the mixture to react at 75°-80° C. for 5 hours, 0.07 parts of dibutyl tin dilaurate were added thereto and the reaction mixture was further heated for 5 hours. Then, 138 parts of methyl ethyl ketone and 238 parts of toluene were added to dilute the reaction mixture to a concentration of 30%. The polyurethane resin solution obtained was kept at 60° C. and 14.5 parts of 5-methyl-4,6-dioxa-1-azabicyclo-[3,3,0]octane as a bicyclic amide acetal were added thereto. After one hour, the acid value of the modified polyurethane resin was reduced to 5 equivalents/$10^6$ g. Even though heating was further continued, the acid value did not change. The acid value of the polyurethane resin before the addition of the bicyclic amide acetal was 380 equivalents/$10^6$ g.

The molecular weight of the modified polyurethane resin was determined by gel permeation chromatography. The results showed that the modified polyurethane resin (hereafter referred to as (P-1)) was a linear polyurethane resin having a molecular weight of 33,000 and a molecular weight distribution of 2.0. Prior to the modification, its molecular weight and molecular weight distribution were 31,000 and 2.0, respectively.

Moreover, with the use of the same starting materials as shown in Table 1, the modified polyurethane resin (P-2 and P-3) of Examples B and C, respectively, were prepared in a manner similar to that of Example A.

Example D

A modified polyurethane resin (P-4) was prepared in a manner similar to that of Example A from the starting materials shown in Table 1, using polyester (II) having a molecular weight of 2,000, which is composed of terephthalic acid/isophthalic acid/monosodium $\beta$-carboxyethylphosphinate//ethylene glycol/neopentyl glycol (the molar ratio thereof being 60/38/2//60/40). The characteristics of the resin obtained are shown in Table 1 below.

Examples E to G

Modified polyurethane resins (P-5 to P-7) were prepared in a manner similar to that of Example A, using as a polyester component, polycaprolactone having a molecular weight of 1,000 and an acid value of 3 equivalents/$10^6$ g. The modification was conducted with bicyclic amide acetals. The characteristics of the resins obtained are shown in Table 1 below. The equivalent ratio of the bicyclic amide acetal used for the modification to the carboxyl groups of the unmodified polyurethane resin was 0.99 in Example E (P-5), 0.70 in Example F (P-6), and 1.29 in Example G (P-7), respectively.

Examples H to J

First, polyester (III) as a polyester component was prepared as follows: After polycondensation of terephthalic acid/isophthalic acid/trimellitic acid//ethylene glycol/neopentyl glycol (the molar ratio thereof being 50/45/5//50/50), trimellitic anhydride was added thereto at 220° C. under nitrogen atmosphere in an amount of 5 mol % based on the total acid components to give polyester (III) having a molecular weight of 1,000 and an acid value of 800 equivalents/$10^6$ g.

Modified polyurethane resins (P-8 to P-10) were prepared in a manner similar to that of Example A, using the polyester (III) and the starting materials shown in Table 1 below. The characteristics of the resins obtained are shown in Table 1 below.

Comparative Example A

A modified polyurethane resin (U-1) was prepared in a manner similar to that of Example A, except that a carboxyl group equivalent of the unmodified polyurethane resin was 40 equivalents/10⁶ g.

Comparative Examples B and C

The unmodified polyurethane resins prepared in Examples E to G were modified by bicyclic amide acetals (U-2 and U-3), respectively. The equivalent ratio of the bicyclic amide acetal used for the modification to the carboxyl groups of the unmodified polyurethane resin was 0.40 in Comparative Example B and 2.20 in Comparative Example C, respectively.

Comparative Examples D and E

Modified polyurethane resins (U-4 and U-5) were prepared in a manner similar to that of Examples H to J, using the starting materials shown in Table 2 below. In Comparative Example D, the unmodified polyurethane resin had a molecular weight of 7,200. In Comparative Example E, the unmodified polyurethane resin had a carboxyl group equivalent of 2,240 equivalents/10⁶ g. Further, the cloudy solution was obtained in Comparative Example E.

TABLE 1

| | | | Examples | | | | | |
|---|---|---|---|---|---|---|---|---|
| | | | A | B | C | D | E | F |
| Before modification | Composition (parts by weight) | Polyester*¹ | Polyester (I) 100  Polybutylene adipate 100 | Polyester (I) 100  Polybutylene adipate 100 | Polyester (I) 100  Polybutylene adipate 100 | Polyester (II) 100 | Polycaprolactone (molecular weight = 1000) 100 | Polycaprolactone (molecular weight = 1000) 100 |
| | | Diisocyanate | MDI 70 | MDI 70 | MDI 68 | MDI 19 | MDI 38 | MDI 38 |
| | | Low molecular weight bifunctional component | DMPA 14  NPG 8 | DMPA 2.5  NPG 17 | DMPA 24 | Tartaric acid 5 | DMPA 7 | DMPA 7 |
| | Molecular weight | | 31,000 | 45,000 | 24,000 | 9,500 | 52,000 | 52,000 |
| | Molecular weight distribution | | 2.0 | 2.1 | 2.0 | 1.9 | 2.2 | 2.2 |
| | Amount of functional group (equivalents/10⁶ g) | Carboxyl group | 380 | 66 | 615 | 270 | 360 | 360 |
| | | Metal sulfonate group | 33 | 31 | 33 | — | — | — |
| | | Metal salt group of acidic phosphorous compound | — | — | — | 150 | — | — |
| After modification | Amount of bicyclic amide acetal used*² (parts by weight) | | 14.5 | 2 | 24 | 4.4 | 6.7 | 4.7 |
| | Molecular weight | | 33,000 | 45,000 | 25,000 | 9,800 | 53,000 | 52,000 |
| | Molecular weight distribution | | 2.0 | 2.1 | 2.0 | 1.9 | 2.2 | 2.2 |
| | Amount of carboxyl group (equivalents/10⁶ g) | | 5 | 2 | 2 | 0 | 10 | 98 |
| Symbol of modified polyurethane | | | P-1 | P-2 | P-3 | P-4 | P-5 | P-6 |

| | | | Examples | | | |
|---|---|---|---|---|---|---|
| | | | G | H | I | J |
| Before modification | Composition (parts by weight) | Polyester*¹ | Polycaprolactone (molecular weight = 1000) 100 | Polyester (III) 100 | Polyester (III) 100 | Polyester (III) 100 |
| | | Diisocyanate | MDI 100 | MDI 45 | MDI 36 | MDI 35 |
| | | Low molecular weight bifunctional component | DMPA 7 | NPG 10 | DMPA 8 | Tartaric acid 10 |
| | Molecular weight | | 52,000 | 12,000 | 9,500 | 10,500 |
| | Molecular weight distribution | | 2.2 | 2.5 | 2.5 | 2.7 |
| | Amount of functional group (equivalents/10⁶ g) | Carboxyl group | 360 | 520 | 970 | 1,450 |
| | | Metal sulfonate group | — | — | — | — |
| | | Metal salt group of acidic phosphorous compound | — | — | — | — |
| After modification | Amount of bicyclic amide acetal used*² (parts by weight) | | 8.7 | 10.4 | 18 | 28 |
| | Molecular weight | | 53,000 | 12,800 | 10,200 | 11,300 |
| | Molecular weight distribution | | 2.2 | 2.5 | 2.6 | 2.7 |

TABLE 1-continued

| | | | | | |
|---|---|---|---|---|---|
| | Amount of carboxyl group (equivalents/$10^6$ g) | 0 | 5 | 5 | 5 |
| | Symbol of modified polyurethane | P-7 | P-8 | P-9 | P-10 |

TABLE 2

| | | | Comparative Examples | | | | |
|---|---|---|---|---|---|---|---|
| | | | A | B | C | D | E |
| Before modification | Composition (parts by weight) | Polyester[*1] | Polyester (I) 100 Polybutylene adipate 100 | Polycaprolactone (molecular weight = 1000) 100 | Polycaprolactone (molecular weight = 1000) 100 | Polyester (III) 100 | Polyester (III) 100 |
| | | Diisocyanate | MDI 70.5 | MDI 38 | MDI 38 | MDI 39 | MDI 62 |
| | | Low molecular weight bifunctional component | DMPA 1.5 NPG 18 | DMPA 7 | DMPA 7 | NPG 10 | Tartaric acid 25 |
| | Molecular weight | | 44,000 | 52,000 | 52,000 | 7,200 | 10,200 |
| | Molecular weight distribution | | 2.1 | 2.2 | 2.2 | 2.3 | 2.6 |
| | Amount of functional group (equivalents/$10^6$ g) | Carboxyl group | 40 | 360 | 360 | 540 | 2,240 |
| | | Metal sulfonate group | 32 | — | — | — | — |
| | | Metal salt group of acidic phosphorous compound | — | — | — | — | — |
| After modification | Amount of bicyclic amide acetal used[*2] (parts by weight) | | 1.5 | 2.7 | 14.8 | 10.4 | 54.5 |
| | Molecular weight | | 44,000 | 52,000 | 53,000 | 7,700 | 11,200 |
| | Molecular weight distribution | | 2.1 | 2.2 | 2.2 | 2.3 | 2.6 |
| | Amount of carboxyl group (equivalents/$10^6$ g) | | 2 | 220 | 0 | 5 | 5 |
| Symbol of modified polyurethane | | | U-1 | U-2 | U-3 | U-4 | U-5 |

[*1] Polyester (I) is composed of terephthalic acid/isophthalic acid/sodium 5-sulfoisophthalic acid//ethylene glycol/neopentyl glycol (the molar ratio thereof being 60/38/2//60/40). The polyester (I) has a molecular weight of 2,000 and an acid value of 5 equivalents/$10^6$ g.
Polyester (II) is composed of terephthalic acid/isophthalic acid/monosodium β-carboxyethylphosphinate//ethylene glycol/neopentyl glycol (the molar ratio thereof being 56/46/4//50/50). The Polyester (II) has a molecular weight of 2,000 and an acid value of 3 equivalents/$10^6$ g.
Polyester (III) is obtained from the polymer of terephthalic acid/isophthalic acid/trimellitic acid//ethylene glycol/neopentyl glycol (the molar ratio thereof being 50/45/5//50/50) by adding thereto, after polycondensation, 5 moles of trimellitic anhydride at 220° C. under nitrogen atmosphere. The Polyester (III) has a molecular weight of 1,000 and an acid value of 800 equivalents/$10^6$ g.
[*2] Bicyclic amide acetal is 5-methyl-4,6-dioxa-1-aza-bicyclo-[3,3,0]octane.

The following examples (1 to 13) are of magnetic recording media prepared with various modified polyurethane resins in accordance with the present invention, whereas the following comparative examples (1 to 9) are of magnetic recording media prepared with various modified polyurethane resins departing from the scope of the present invention.

Example 1

A magnetic coating composition was prepared from the following ingredients:

| Ingredients | Parts by weight |
|---|---|
| Modified polyurethane resin (P-1) of Example A (30 percent solids in a mixed solvent of methyl ethyl ketone and toluene) | 100 |
| Cobalt-coated γ-ferrite (BET 50 m²/g) | 120 |
| Stearic acid | 1 |
| Butyl stearate | 1 |
| Toluene | 100 |
| Cyclohexanone | 100 |

The ingredients were charged to a ball mill and dispersed for 48 hours. Then, 5 parts of Coronate L (polyisocyanate compound available from Japan Polyurethane Industry Co., Ltd.) were added to the mixture as a curing agent. The mixture was further dispersed for one hour to form a magnetic coating composition. The magnetic coating composition was then applied to a polyethylene terephthalate film with a thickness of 12 μm, resulting in a dry thickness of 4 μm. While applying a magnetic field of 3,000 gauss, the film was dried. After allowing the film to stand at 60° C. for one day, the film was slit in a ½ inch width to form a magnetic tape. The characteristics of the magnetic tape obtained are shown in Table 3 below.

Examples 2 to 6

Magnetic tapes were prepared in a manner similar to that of Example 1, except that the components of a resinous binder were changed as shown in Table 3 below. The characteristics of the magnetic tapes obtained are shown in Table 3 below. The formulation ratio "1/1" of the components is expressed in terms of a weight ratio (the same will apply hereinafter).

Examples 7 to 13

First, 120 parts of magnetic powders as used in Example 1, 100 parts of toluene, and 2 parts of lecithin as a dispersing agent were charged to a ball mill and dispersed for 5 hours. Then, 100 parts of the solution as obtained in Example E (30 percent solids in a mixed solvent of methyl ethyl ketone and toluene), 1 part of stearic acid, 1 part of butyl stearate, and 100 parts of cyclohexane were added to the mixture and dispersed for 48 hours. Thereafter, in a manner similar to that of Example 1, Coronate L was added to the dispersion to form a magnetic coating composition. With the use of the magnetic coating composition, a magnetic tape was prepared. The characteristics of the magnetic tape obtained are shown in Table 3 below.

In the same manner as described above, magnetic tapes were prepared by the use of resinous binders shown in Table 2 below. The characteristics of the magnetic tapes obtained are shown in Table 3 below.

Comparative Examples 1 and 2

Magnetic tapes were prepared in a manner similar to that of Example 1, using a solution of the modified polyurethane resin (U-1) as obtained in Comparative Example A and a combination of this solution and a vinyl chloride copolymer, respectively. The characteristics of the magnetic tapes obtained are shown in Table 4 below.

Comparative Examples 3 to 7

After treating magnetic particles with lecithin in a manner similar to that of Example 7, a resinous binder shown in Table 4, stearic acid, butyl stearate, and cyclohexane were added thereto and the mixture was dispersed. Coronate L was added thereto and again dispersed to obtain a magnetic coating composition. With the use of the magnetic coating compositions, magnetic tapes were prepared. The characteristics of the magnetic tapes obtained are shown in Table 4 below.

Comparative Examples 8 and 9

Magnetic tapes were obtained in a manner similar that of Example 1, using polyurethane resin (C) and polyurethane resin (D), respectively, in place of the resinous binder of Example 1. The characteristics of the magnetic tapes obtained are shown in Table 4 below.

Here, the polyurethane resin (C) is a linear modified polyurethane resin containing metal sulfonate groups and the polyurethane resin (D) is a branched polyurethane resin containing metal sulfonate groups.

TABLE 3

| Example No. | Resinous binder[1] | Dispersing AGENT[2] | Gloss[3] | Squareness Ratio[4] | Solvent resistance[5] (%) | Powder Drop[4] 0° C. | 20° C. | 40° C. | Running durability[7] (20° C.) |
|---|---|---|---|---|---|---|---|---|---|
| 1 | Modified polyurethane(P-1) | None | 135 | 0.85 | 8 | O | O | Δ | O |
| 2 | (P-1)/vinyl chloride copolymer(A) = 1/1 | None | 125 | 0.83 | 10 | O | O | O | O |
| 3 | Modified polyurethane(P-2) | None | 130 | 0.83 | 36 | O | Δ | Δ | O |
| 4 | Modified polyurethane(P-3) | None | 133 | 0.84 | 3 | O | O | O | O |
| 5 | Modified polyurethane(P-4) | None | 130 | 0.83 | 18 | Δ | O | O | O |
| 6 | (P-4)/polyurethane resin (B) = 1/1 | None | 100 | 0.80 | 25 | O | O | O | O |
| 7 | (P-5)/vinyl chloride copolymer(A) = 1/1 | Lecithin | 95 | 0.78 | 15 | O | O | O | O |
| 8 | (P-6)/vinyl chloride copolymer(A) = 1/1 | Lecithin | 78 | 0.76 | 38 | Δ | O | O | O |
| 9 | (P-7)/vinyl chloride copolymer(A) = 1/1 | Lecithin | 97 | 0.78 | 15 | O | O | O | O~Δ |
| 10 | (P-8)/polyurethane resin (B) = 1/1 | Lecithin | 85 | 0.77 | 15 | Δ | O | O | O |
| 11 | (P-8)/polyurethane resin (B) = 1/1 | Lecithin | 80 | 0.76 | 3 | O | O | O | O |
| 12 | (P-9)/polyurethane resin (B) = 1/1 | Lecithin | 83 | 0.77 | 3 | O | O | O | O |
| 13 | (P-10)/polyurethane resin (B) = 1/1 | Lecithin | 82 | 0.77 | 3 | O | O | O | O |

TABLE 4

| Comparative Example No. | Resinous binder[1] | Dispersing AGENT[2] | Gloss[3] | Squareness Ratio[4] | Solvent resistance[5] (%) | Powder Drop[4] 0° C. | 20° C. | 40° C. | Running durability[7] (20° C.) |
|---|---|---|---|---|---|---|---|---|---|
| 1 | Modified polyurethane (U-1) | None | 133 | 0.85 | 55 | O | Δ | x | O |
| 2 | (U-1)/vinyl chloride copolymer(A) = 1/1 | None | 126 | 0.83 | 68 | O | O | x | O |
| 3 | (U-2)/vinyl chloride copolymer (A) = 1/1 | Lecithin | 45 | 0.65 | 58 | Δ | Δ | x | O |
| 4 | (U-3)/vinyl chloride copolymer(A) = 1/1 | Lecithin | 88 | 0.78 | 10 | x | x | x | x |
| 5 | (U-4)/vinyl chloride copolymer(A) = 1/1 | Lecithin | 85 | 0.77 | 18 | Δ | Δ | x | O |
| 6 | (U-5)/polyurethane resin (B) = 1/1 | Lecithin | 78 | 0.73 | 3 | x | Δ | x | O |
| 7 | Polyurethane resin (B)/vinyl chloride copolymer(A) = 1/1 | Lecithin | 60 | 0.67 | Magnetic coating layer was destroyed. | x | x | x | O |
| 8 | Polyurethane resin(C) | None | 133 | 0.85 | 69 | O | Δ~x | x | O |

TABLE 4-continued

| Comparative Example No. | Resinous binder[*1] | Dispersing AGENT[*2] | Gloss[*3] | Squareness Ratio[*4] | Solvent resistance[*5] (%) | Powder Drop[*4] 0° C. | 20° C. | 40° C. | Running durability[*7] (20° C.) |
|---|---|---|---|---|---|---|---|---|---|
| 9 | Polyurethane resin(D) | None | 83 | 0.77 | 48 | O | Δ | x | O |

[*1]The ratio of a resin content in the resinous binder to the magnetic particles is 4:1 (in weight ratio). Vinyl chloride copolymer (A) is "VAGH" available from Union Carbide Co., Ltd.
Polyurethane resin (B) is "Nipporan 2304" which is an adipate type polyurethane resin available from Japan Polyurethane Co., Ltd.
Polyurethane resin (C) is a polyurethane resin obtained by substituting all of the lower molecular weight bifunctional components as used in Example A with neopenyl glycol, wherein the ratio of the starting materials used (polyester (I)/polybutylene adipate/NPG/MDI) is 100/100/19/69.5. The polyurethane resin (C) has a molecular weight of 33,000, a molecular weight distribution of 2.0, an acid value of 3 equivalents/$10^6$ g, and metal sulfonate groups of 32 equivalents/$10^6$.
Polyurethane resin (D) is a polyurethane resin obtained by preparing a prepolymer with isocyanate terminals form polyester (I) as used in Example A, polybutylene adipate, neopentyl glycol, and MDI, and then by chain extending the prepolymer with trimethylolpropane, wherein the ratio of the starting materials used (polyester (I)/polybutylene adipate/NPG/MDI/trimethylolpropane) is 100/100/14/63/5. The polyurethane resin (D) has a molecular weight of 25,000, a molecular weight distribution of 3.1, and acid value of 4 equivalents/$10^6$ g, and metal sulfonate groups of 33 equivalents/$10^6$ g.
[*2]The ratio of the dispersing agent to the magnetic particles is 1:60 (in weight ratio).
[*3]The 60° gloss of the magnetic coating layer is determined.
[*4]The ratio of saturated magnetic flux density to residual magnetic flux density is determined.
(Higher gratings of the 60° gloss and the squareness ratio show more excellent dispersibility of magnetic particles.)
[*5]The magnetic tape is immersed in methyl ethyl ketone at room temperature for 10 hours and the amount of magnetic coating composition extracted into the methyl ethyl ketone is then determined. How much of the magnetic coating layer is removed from the tape is a measure of the solvent resistance.
[*6]After the magnetic tape is repeatedly run 100 times in a commercially available video player at temperatures of 0° C., 20° C., and 40° C., respectively, the guide rollers, cylinder, and magnetic head of the video player are observed. The degree of contamination with magnetic particles is a measure of the powder drop. Ratings are "O" for little adhesion of magnetic particles; "Δ" for slight adhesion of magnetic particles; and "x" for significant adhesion of magnetic particles and severe scratching on the magnetic coating layer.
[*7]The magnetic tape is run in a video player at 20° C., and the movement of the tape in a zigzag direction with a squeak, the elongation on one side at the edge of the tape, and the bending of the tape were observed.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A magnetic recording medium comprising a nonmagnetic support and a magnetic coating layer formed thereon, said magnetic coating layer being formed by applying a magnetic coating composition comprising a resinous binder and magnetic particles dispersed therein, wherein said coating composition contains, as a resinous binder, a modified polyurethane resin obtained by reacting a polyurethane resin (A) with a bicyclic amide acetal (B), said polyurethane resin (A) having carboxyl groups in an amount of 50 to 2,000 equivalents $10^6$ g and the equivalent ratio of said bicyclic amide acetal (B) to the carboxyl groups of the polyurethane resin (A) being within the range of 0.5 to 2.0.

2. A magnetic recording medium according to claim 1, wherein said polyurethane resin (A) contains, as a functional group, at least one selected from the class consisting of metal sulfonate groups and metal salt groups of an acidic phosphorus compound in an amount of 4 to 400 equivalents per $10^6$ grams of the resin.

3. A magnetic recording medium according to claim 2, wherein said polyurethane resin (A) is a polyurethane resin obtained by reacting therewith a phosphorus compound of the formula:

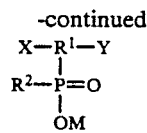  (I)

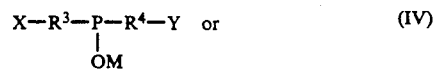

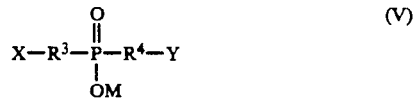

wherein each of X and Y, independently is an ester-forming functional group; $R^1$ is a hydrocarbon group of 3 to 10 carbon atoms; $R^2$ is an alkyl group of 1 to 12 carbon atoms, a cycloalkyl group of 6 to 12 carbon atoms, or an aryl group of 6 to 12 carbon atoms, wherein the aryl group may contain a halogen atom, a hydroxyl group, an OM' group (wherein M' is an alkali metal atom), or an amino group; each of $R^3$ and $R^4$, independently is an alkylene group of 2 to 4 carbon atoms; and M is an alkali metal atom.

4. A magnetic recording medium according to claim 1, wherein said bicyclic amide acetal (B) is of the formula:

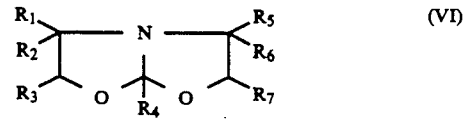

wherein each of $R_1$, $R_2$, $R_5$, $R_6$, and $R_7$, independently is hydrogen or an alkyl group of 1 to 20 carbon atoms; $R_3$ is hydrogen, an alkyl group of 1 to 20 carbon atoms, an aryl group of 6 to 12 carbon atoms, or an ether group of 1 to 20 carbon atoms; and $R_4$ is an alkyl group of 1 to 20 carbon atoms or an alkaryl group of 7 to 22 carbon atoms.

* * * * *

UNITED STATES PATENT AND TRADEMARK OFFICE
CERTIFICATE OF CORRECTION

PATENT NO. : 5,009,960

DATED : April 23, 1991

INVENTOR(S) : Takeski Yatsuka; Hiroshi Murata; Yutaka Mizumura; Nobukazu Rotera

It is certified that error appears in the above—identified patent and that said Letters Patent is hereby corrected as shown below:

Column 2, Line 55 after "per" insert $--10^6--$.
Columns 9 and 10, Table 1, Line 58 under Examples J, change "35" to
 -- 39 --;
Columns 15 and 16, Table 4, end of Line 9, change "neopenyl" to
 -- neopentyl --; and,
Columns 15 and 16, Table 4, beginning of line 15, change "and" to
 -- an --.

Signed and Sealed this

Twenty-seventh Day of April, 1993

Attest:

MICHAEL K. KIRK

Attesting Officer

Acting Commissioner of Patents and Trademarks